United States Patent
Stone

(10) Patent No.: US 9,529,461 B2
(45) Date of Patent: Dec. 27, 2016

(54) PRINTED ARTICLE

(71) Applicant: Novalia Ltd, Cambridge, Cambridgeshire (GB)

(72) Inventor: Kate Stone, Cambridge (GB)

(73) Assignee: Novalia Ltd, Cambridge (GB)

( * ) Notice: Subject to any disclaimer, the term of this patent is extended or adjusted under 35 U.S.C. 154(b) by 0 days.

(21) Appl. No.: 14/397,777

(22) PCT Filed: Apr. 29, 2013

(86) PCT No.: PCT/GB2013/051085
§ 371 (c)(1),
(2) Date: Oct. 29, 2014

(87) PCT Pub. No.: WO2013/164586
PCT Pub. Date: Nov. 7, 2013

(65) Prior Publication Data
US 2015/0103020 A1    Apr. 16, 2015

(30) Foreign Application Priority Data

Apr. 30, 2012 (GB) .................................. 1207507.3

(51) Int. Cl.
*G09G 5/00* (2006.01)
*G06F 3/041* (2006.01)
(Continued)

(52) U.S. Cl.
CPC ............... *G06F 3/041* (2013.01); *B42D 3/123* (2013.01); *B42D 15/022* (2013.01); *G09B 5/062* (2013.01);
(Continued)

(58) Field of Classification Search
CPC .... G06F 3/041; G06F 2203/041; G06F 3/044; G06F 3/043
(Continued)

(56) References Cited

U.S. PATENT DOCUMENTS

| 4,368,354 A | 1/1983 | Furihata et al. |
| 4,941,172 A | 7/1990 | Winebaum et al. |

(Continued)

FOREIGN PATENT DOCUMENTS

| EP | 0070653 A1 | 1/1983 |
| GB | 2462289 A | 2/2010 |

(Continued)

OTHER PUBLICATIONS

International Search Report for application PCT/GB2013/051085, dated Dec. 19, 2013, 4 pages.
(Continued)

*Primary Examiner* — Jennifer Nguyen
(74) *Attorney, Agent, or Firm* — McCarter & English, LLP; David R. Burns

(57) ABSTRACT

A printed article (2) and electronic device (3) are acoustically coupled. The printed article is able to receive user input by touching an area or areas (4) of the printed article with their finger and output an acoustic signal (5) which is detected, decoded and processed by the electronic device. Thus, the printed article can be used to provide remote user input and/or data, such as a universal resource identifier (URI), to the electronic device.

24 Claims, 3 Drawing Sheets

(51) Int. Cl.
*B42D 3/12* (2006.01)
*B42D 15/02* (2006.01)
*G09B 5/06* (2006.01)
*G09F 25/00* (2006.01)

(52) U.S. Cl.
CPC ..... *G09F 25/00* (2013.01); *G06F 2203/04105* (2013.01)

(58) Field of Classification Search
USPC ........................................ 345/168, 169, 173
See application file for complete search history.

(56) References Cited

U.S. PATENT DOCUMENTS

| | | | |
|---|---|---|---|
| 5,208,860 A * | 5/1993 | Lowe | H04S 1/002 |
| | | | 381/17 |
| 5,423,073 A * | 6/1995 | Ogawa | H04H 20/31 |
| | | | 381/77 |
| 5,452,352 A | 9/1995 | Talton | |
| 5,538,430 A | 7/1996 | Smith et al. | |
| 5,810,604 A | 9/1998 | Kopp, Jr. et al. | |
| 6,141,032 A | 10/2000 | Priest | |
| 7,197,134 B1 | 3/2007 | Ruckart | |
| 2005/0234774 A1 * | 10/2005 | Dupree | G06Q 30/02 |
| | | | 705/14.57 |
| 2008/0016133 A1 | 1/2008 | Tien | |
| 2010/0193587 A1 * | 8/2010 | Boucard | G06K 19/0723 |
| | | | 235/454 |
| 2010/0199162 A1 * | 8/2010 | Boucard | G06F 1/1626 |
| | | | 715/224 |
| 2010/0222041 A1 | 9/2010 | Dragt | |

FOREIGN PATENT DOCUMENTS

| | | |
|---|---|---|
| GB | 2464537 A | 4/2010 |
| WO | 8803294 A1 | 5/1988 |
| WO | 9412963 A1 | 6/1994 |
| WO | 2008104995 A2 | 9/2008 |
| WO | 2012007765 A2 | 1/2012 |

OTHER PUBLICATIONS

Madhavapeddy A. et al., "Audio networking: The Forgotten Wireless Technology," IEEE Pervasive Computing, IEEE Service Center, Los Alamitos, CA, US, Jan. 1, 2005, pp. 55-60, XP003028579, pp. 55-60.
Search Report for United Kingdom application GB1207507.3, dated Jun. 6, 2013, 2 pages.
Written Opinion of the International Searching Authority on application PCT/GB2013/051085, dated Dec. 19, 2013. 6 pages.
United Kingdom Examination Report for application GB1207507.3, dated Dec. 17, 2014, 4 pages.
Exam Report issued Mar. 22, 2016 in related European Patent application No. 13726810.8, 5 pages.

* cited by examiner

PRINTED ARTICLE

RELATED APPLICATIONS

This application is a 35 U.S.C. §371 National Stage filing of International Application No. PCT/GB2013/051085, filed Apr. 29, 2013, which claims the benefit of United Kingdom Patent Application No. 1207507.3, filed Apr. 29, 2012. The entire contents of each of the foregoing applications are explicitly incorporated herein by reference.

FIELD OF THE INVENTION

The present invention relates to a printed article.

BACKGROUND

Electronic components are increasingly being incorporated into printed articles, such as books, posters and greeting cards, to allow printed articles to become more interactive.

For example, GB 2464537 A describes a book whereby a story can be read in different ways because user input can affect the narrative and/or a different narrative can be presented to the reader each time the book is opened.

A user may find a printed article more enjoyable or useful if they can use the printed article to control or interact with an electronic device, such as computer.

For example, GB 2475253 A describes a poster which can be custom made and used to control a presentation on a display.

TW 2008 21976 A describes a smart electronic poster system which automatically transmits various media information, such as text, a voice message, a photo file or video files, to a client about a product.

However, enhancing a printed article to allow it to communicate with other electronic devices can increase complexity and cost of the printed article.

The present invention seeks to provide a simple and cheap way of allowing a printed article to communicate with an electronic device.

SUMMARY OF THE INVENTION

According to a first aspect of the present invention there is provided a printed article. The printed article comprises a substrate, at least one touch- or proximity-sensitive switch supported on the substrate, a processor and a speaker. The processor is configured, in response to actuation of switch (es), to generate data and the speaker is configured to output an audio frequency signal including the data.

Thus, the printed article can transmit data to an electronic device having a microphone through acoustic coupling.

The at least one switch may comprise conductive ink and/or conductive foil. The printed article may comprise at least two, at least three or at least four touch- or proximity-sensitive switches. The substrate may comprise paper or card and/or plastic.

The processor may be configured to generate a signal which encodes the data and to output the signal to the speaker.

The processor may be configured to output the data in a burst. The processor may be configured to repeat the burst. Thus, a recurring pattern can be used as a code and Fast Fourier Transform can be used to identify the pattern as the code. This can help an electronic device to identify and decode the data, for example, using frequency analysis and averaging techniques. The burst may have a duration no more than 100 ms, no more than 50 ms or no more than 20 ms.

The signal may comprise at least two frequency components. One frequency component can be used as a frequency reference or "clock frequency" and another frequency component may be modulated, e.g. using frequency modulation, amplitude modulation or the like. Using two or more frequency components allows changes in relative frequencies to be measured.

The data may include data generated in dependence on the identity of one or more switches actuated, for example, a sequence of key strokes. The data may include measured data, such as temperature. The data may include predefined data, such as, a uniform resource identifier and/or an identifier which identifies the printed article (i.e. a UID).

The data may be encoded using modulation.

The printed article may take the form, for example, of a greeting card, a label, a poster, a point-of-sale display, a postcard, a pamphlet, a book, a magazine, a newspaper, a beer mat, a paper utensil (such as a plate, cup or bowl), packaging, a folder or a board game.

The point-of-sale display may take the form of shelf edging, a dummy pack (i.e. an empty pack), a display pack, a display stack, a mobile, a poster or a banner.

The data may identify a switch or switches. The data may identify a sequence in which switches are activated. The data may include a uniform resource identifier and/or a target identifier.

The data may include a result of a calculation. For example, actuation of a switch (herein referred to as a "key press" or "key stroke") may provide a value (for example, representing an answer to a question) and a user may enter a sequence of key strokes (for example, in response to a series of questions). In response to a given key press or a given number of key presses, a result may be calculated and the result may be sent.

The data may include locally-generated data or locally-measured data, such as temperature.

According to a second aspect of the present invention there is provided a system comprising the printed article and an electronic device which includes a microphone for acoustically coupling the printed article and electronic device.

According to a third aspect of the present invention there is provided an electronic device comprising a processor and a microphone for acoustically coupling the electronic device and a printed article. The electronic device is configured to receive an audio frequency signal and to decode the signal to extract the data.

The device may be a mobile device, such as mobile phone. The mobile phone may be a smart phone or feature phone.

The electronic device may include a module for performing frequency analysis (e.g. a Fast Fourier Transform) of an audio frequency signal. The electronic device may include a module for averaging an audio signal.

By installing suitable software on an electronic device, the device can be controlled using printed article.

According to a fourth aspect of the present invention there is provided a method comprising a printed article receiving user input via at least one touch- or proximity-sensitive switch, in response to actuation of switch(es), generating data and outputting an audio frequency signal including the data.

The method may comprise an electronic device receiving the audio frequency signal and decoding the signal to extract the data.

The method may comprise the electronic device performing frequency analysis to identify the data.

The method may comprise the electronic device processing the data. Processing the data may include displaying the data.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
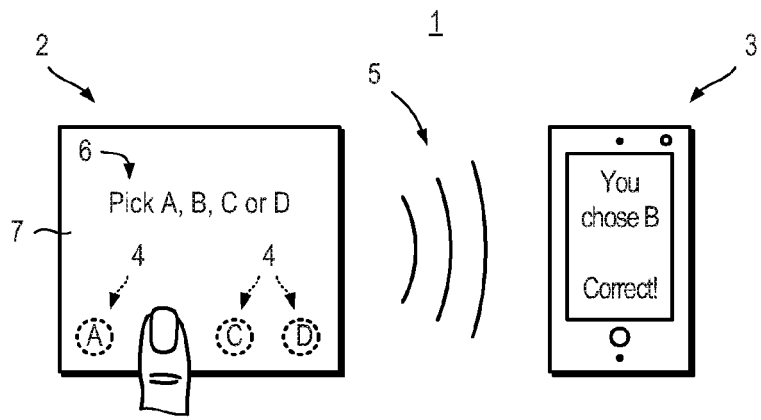
FIG. 1 is a schematic diagram of a system which includes a printed article and an electronic device which are acoustically coupled.

Referring to FIG. 1, a system 1 is shown which comprises a printed article 2 and an electronic device 3, such as a mobile phone, camera or music player, which is capable of detecting sound and processing data.

The printed article 2 and electronic device 3 are acoustically coupled. The printed article 2 is able to receive user input by the user touching an area or areas 4 of the printed article 2 with their finger and to output an acoustic signal 5 which is detected, decoded and processed by the electronic device 3. Thus, the printed article 2 can be used to provide remote user input and/or data, such as a universal resource indicator (URI), to the electric device 3.

Figure 2:
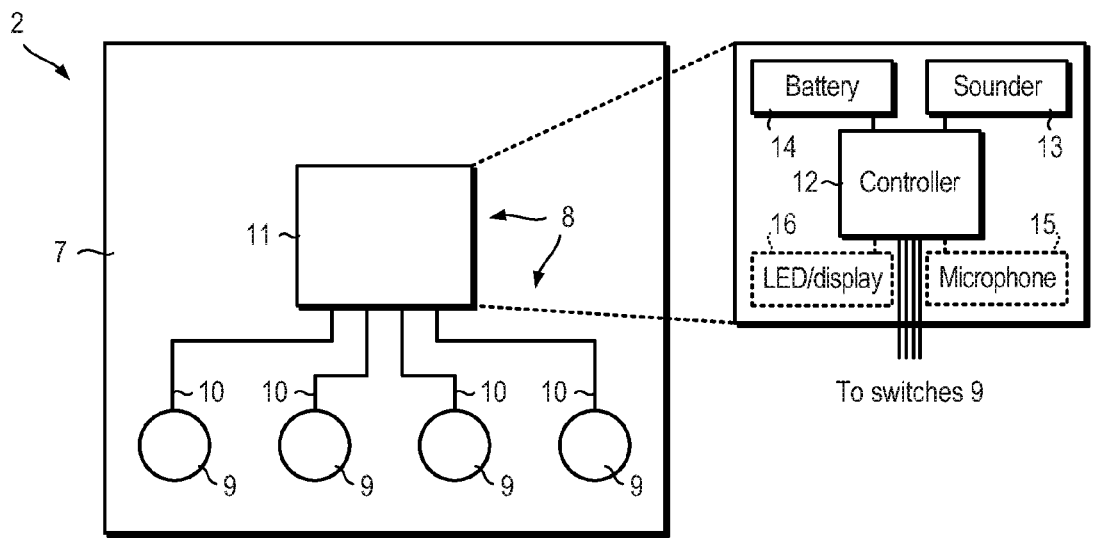
FIG. 2 is a schematic diagram of a printed article.
Figure 3:
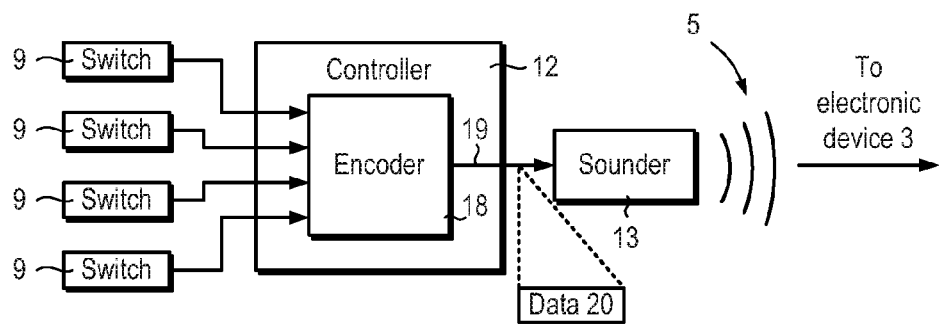
FIG. 3 is a schematic block diagram of switches, a controller and a sounder of a printed article.

Referring also to FIGS. 2 and 3, the printed article 2 includes indicia 6 (for example text and/or images) printed (for example using screen, flexography, offset lithography, ink jet or gravure) on a substrate 7 which comprises paper, card or other fibre-based media and/or plastic. The substrate 7 may comprise a laminate comprising two or more sheets which may comprise different materials, such as paper and plastic.

The printed article 2 is provided with a circuit 8 including a set of one or more conductive pads 9 which provide the touch- or proximity-sensitive switches (or "buttons") and conductive tracks 10 formed on the substrate 7. The conductive pads 9 and tracks 10 comprise metal- or carbon-based conductive ink printed onto the substrate 7. However, the conductive pads 9 and tracks 10 may comprise metal foil stamped onto the substrate 7 or deposited by a physical vapour deposition process. The indicia 6 and switches 9 may be formed on opposite faces of the substrate 7 or on the same face. In some cases, the substrate 7 may comprise two or more sheets and the indicia 6 and switches 9 may be formed on different sheets.

The indicia 6, switches 9 and tracks 10 can be easily formed, for example, using a single printing press, or a continuous or high-speed process line.

Components 11 are mounted onto or embedded into the substrate 7. The components 11 include a controller 12, for example in the form of a Texas Instruments® MSP430® 16-bit microcontroller, a piezoelectric sounder 13 (herein also referred to as a "speaker") and a battery 14. Discrete peripheral components, such as resistors, are not shown. The controller 12 can take other forms and can be provided by more than one integrated circuit.

The components 11 may include a microphone 15 and/or one or more display device(s) 16, such as light emitting diode(s), liquid crystal display (LCD) or electrochromic display (not shown). A microphone 15 can allow two-way communication with the electronic device 3.

Some or all of the components 11 may be formed on a printed circuit board (not shown) which is mounted onto or embedded into the substrate 7, for example, between laminated sheets, or in a recess (not shown) or in a cut-out window (not shown) in the substrate 7. Some or all of the components 11 may be mounted directly onto or embedded into the substrate 7, for example, using conductive tracks (not shown) and conductive glue (not shown). The components may have a low profile, for example, having a thickness no more than a few millimeters.

The components 11 can be mounted on or embedded into the substrate 7 using a continuous sheet feed process forming part of a single continuous or high-speed process line. If a continuous sheet feed process or other or high-speed process is used, large volumes of printed articles 2 can be made. Thus, the printed article 2 can be easily and cheaply fabricated.

Referring in particular to FIG. 3, the controller 12 provides an encoder 18 which receives signal(s) from a switch 9 (or switches 9), interprets the signal(s), generates an electrical signal 19 carrying encoded data 20 and outputs the electrical signal 19 to the sounder 13 which converts the electrical signal 19 into an acoustic signal 5 carrying the encoded data 20. The acoustic signal 5 comprises frequency components lying in an audible frequency range between about 20 Hz to 20 kHz.

The data 20 may comprise an n-bit word (where n=2, 4, 8, 16, 32 or more).

If printed article 2 is intended to send one of only sixteen values, then data 20 may be encoded using dual-tone multi-frequency (DTMF) modulation, for example, for the duration that that the signal 19 is output.

In this case, data 20 is encoded using pulse width modulation (pwm). However, other forms of analogue or digital modulation can be used such as frequency-shift key (fsk) modulation.

The data 20 may identify which switch 9 or switches 9 have been activated. In the case of more than one switch being activated, the data 20 may identify which switches 9 have been activated simultaneously or a sequence in which switches 9 have been activated. The data 20 may identify the printed article 2, for example, using a device identifier. The data 20 may include parity bits, error correction codes and so on.

The encoder 18 may include the encoded data 20 along the length of the signal 19 (for the duration that the signal is transmitted) or in a burst which may be repeated.

Figure 4:
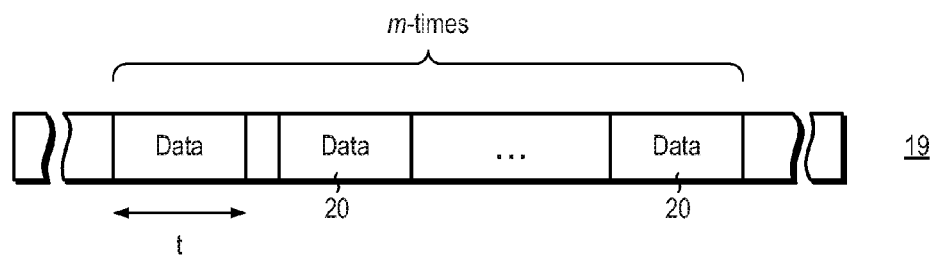
FIG. 4 illustrates encoded segments or "bursts" of data.

Referring also to FIG. 4, the controller 12 can be arranged to output a signal 19 and periodically include data 20 as bursts in the signal 19. For example, data 20 can be transmitted in bursts lasting a period, t, for example, t=20 milliseconds. The bursts can be repeated m-times, for example, where m≥5 or 10.

As shown in FIG. 4, data 20 may be transmitted non-contiguously (i.e. separated by spacers). However, data 20 can be output continuously. Repeating data 20 can help the electronic device 3 (FIG. 3) to identify and decode the data 20.

Figure 5:
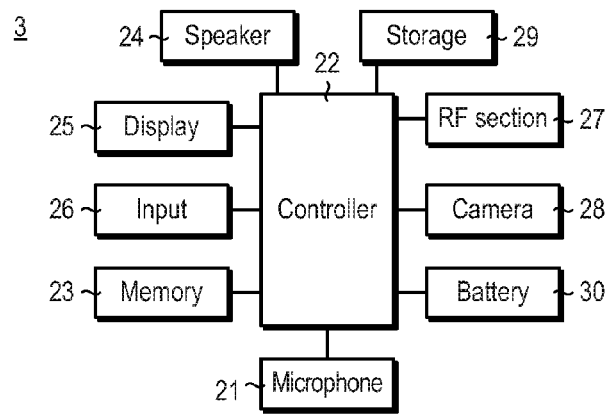
FIG. 5 is a schematic diagram of an example of an electronic device.

Referring to FIG. 5, an example of an electronic device 3 is shown. The electronic device 3 includes a microphone 21, a controller 22 for data processing, and memory 23. In this case, the electronic device 3 is a mobile phone. The mobile phone 3 may take the form of a smart phone or feature phone.

The electronic device 3 may comprise a speaker 24, a display 25, one or more input devices 26, a radio-frequency section 27, image capture device 28, storage 29 (for example removable memory card) and/or a battery 30. The display 25 and the input device 29 or one of the input devices 26 may be integrated and provided in the form of a touch screen.

The electronic device 3 need not be a phone and can take the form of another type of handheld device, such as digital still camera, digital video camera, music player or tablet computer. The electronic device 3 may be multifunctional, i.e. integrate the functions of more than one type of device, such as a phone, camera and music player. The electronic device 3 need not be handheld, but can be portable, such as a lap top computer, or fixed, such as a desktop computer or television set. The electronic device 3 can be incorporated into a larger device, such as a household appliance. The electronic device 3 may or may not be a networked device.

Figure 6:
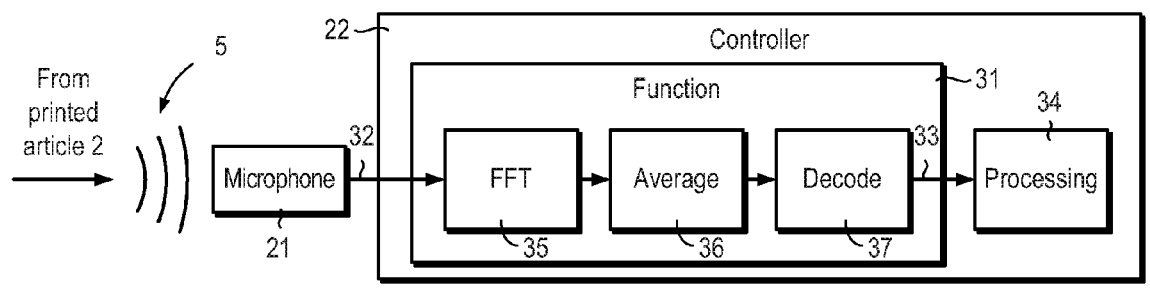
FIG. 6 is a schematic block diagram of a microphone and a controller of an electronic device.
Figure 7:
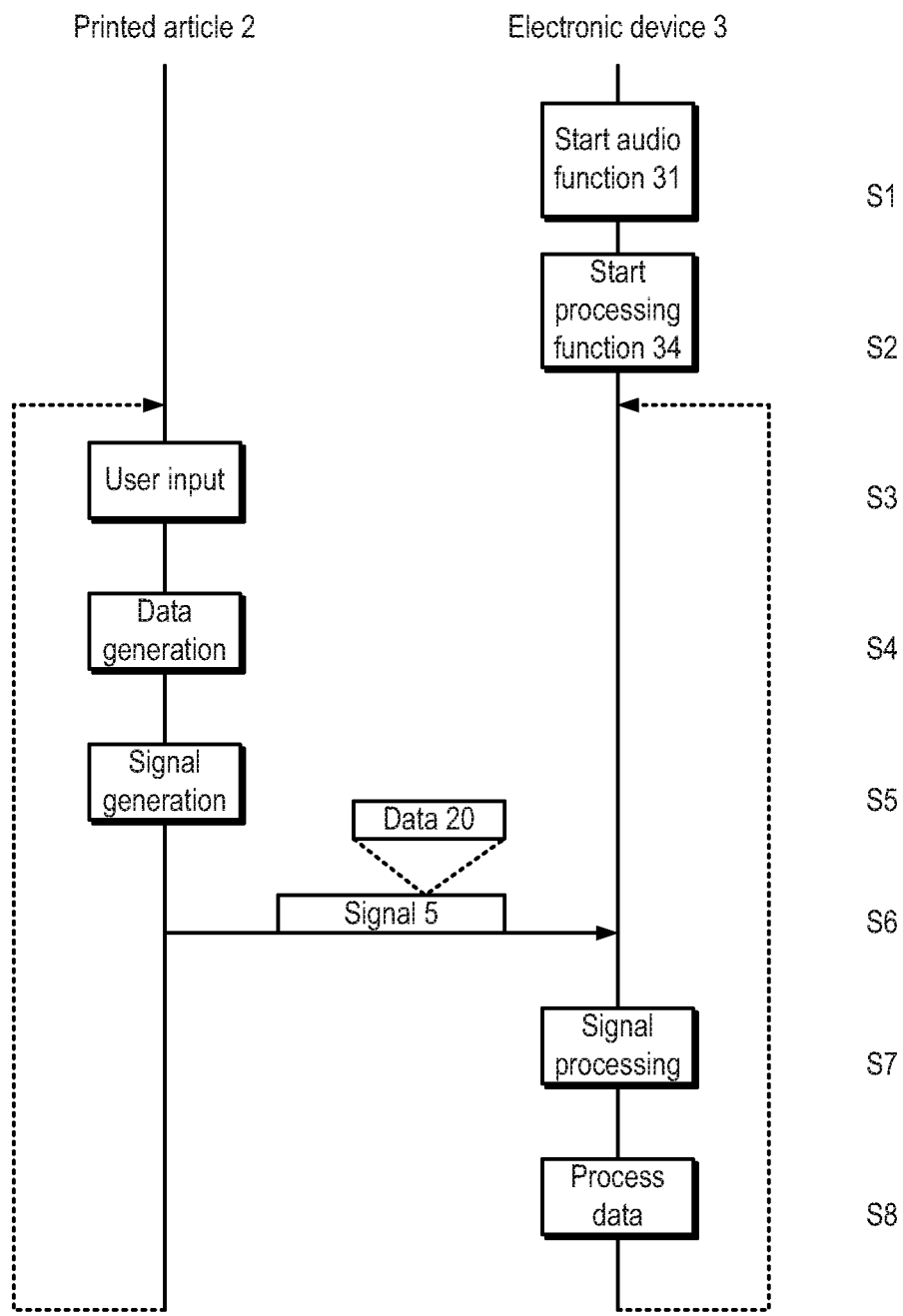
FIG. 7 illustrates a printed article transmitting a message to an electronic device.

Referring in particular to FIG. 6, the controller 22 provides an audio signal analysis and control function 31 which can receive a signal 32 from the microphone 21 and provide an output signal 33 (for example a control signal or data) to a software 34 for processing the output signal 33 which may be an application, a driver and/or operating system.

As shown in FIG. 6, the audio signal analysis and control function 31 may include a fast Fourier transform (FFT) block 35 or other functional module for identifying frequency components in the converted audio signal 33, a signal averaging block 36 and a decoding block 37.

Referring to FIGS. 1 to 7, operation of the system will now be described.

When the electronic device powers on or in response to user instruction, the electronic device 3 starts the audio signal analysis and control function 31 (step S1). When the electronic device powers on or in response to user instruction, the electronic device 3 also starts software 34 (step S2).

The user provides input to the printed article 2 by "pressing" one or more buttons 9 (step S3).

The controller 12 processes user input and generates data 20 (step S4). The controller may simply use a key stroke as an instruction or trigger to transmit predefined data, such as an identifier. The controller 12 may identify the key stroke or key strokes and encode the key stroke(s). The controller 12 may perform a calculation based on the key stroke(s). The controller 12 may take measurement(s), e.g. temperature.

The controller 12 may assemble or arrange data into two or more fields (not shown). For example, a first field (not shown) may include a device identity and a second field (not shown) may identify a key stroke, specify a result or provide predefined data.

The controller 12 generates a signal 19 (step S5) which is passed to the sounder 13 which outputs an acoustic signal 5 (step S6). This provides the user with audible and/or haptic feedback confirming that the user has "pressed" the button. The acoustic signal 5 is received and converted by the microphone 21 in the electronic device 3.

The audio signal analysis and control function 31 processes the converted signal 32 and outputs a signal 33 to the processing block (steps S7 & S8). The electronic device 3 can, for example, display a message, log the key stroke, retrieve or render a file.

Thus, to communicate wirelessly with the electronic device 2, the printed article 2 does not need a radio frequency module, such as a Bluetooth® transceiver module. This can help to reduce the cost and complexity of the circuit 8. This can help allow the printed article to be used more widely. As far as the user is concerned, the printed article 2 appears to be wirelessly connected to the electronic device 3 and may not realise that sound emitted by the printed article 2 is the channel through which connectivity is provided.

It will be appreciated that many modifications may be made to the embodiments hereinbefore described.

The system 1 may include more than one printed article 2 and/or more than one electronic device 3.

Bi-directional connectivity may be provided by including a microphone in the printed article.

The printed article may take the form, for example, of a greeting card, a label, a poster, a point-of-sale display, a postcard, a pamphlet, a book, a magazine, a newspaper, a beer mat, a paper utensil (such as a plate, cup or bowl), packaging, a folder or a board game.

The invention claimed is:

1. A printed article comprising:
   a substrate;
   at least one touch- or proximity-sensitive switch supported on the substrate;
   a processor configured, in response to actuation of the switch(es), to generate encoded data using modulation; and
   a speaker configured to output an audio frequency signal including the encoded data, the audio frequency signal includes a first frequency component having a fixed frequency and a second frequency component having a modulated frequency.

2. A printed article according to claim 1, wherein the at least one switch comprises conductive ink.

3. A printed article according to claim 1, wherein the at least one switch comprises conductive foil.

4. A printed article according to claim 1, comprising at least four touch- or proximity-sensitive switches.

5. A printed article according to claim 1, wherein the substrate comprises paper or card.

6. A printed article according to claim 1, wherein the substrate comprises plastic.

7. A printed article according to claim 1, configured to output the data in a burst.

8. A printed article according to claim 7, configured to repeat the burst.

9. A printed article according to claim 7, wherein the burst has a duration no more than 100 ms.

10. A printed article according to claim 1, wherein the data includes data generated in dependence on the identity of one or more switches actuated.

11. A printed article according to claim 1, wherein the data includes measured data.

12. A printed article according to claim 1, wherein the data includes predefined data.

13. A printed article according to claim 1, wherein the data includes uniform resource identifier.

14. A printed article according to claim 1, wherein the data includes an identifier for identifying the printed article.

15. A printed article according to claim 1, wherein the processor is configured to carry out a calculation in dependence upon the actuation of switch(es) and output a result, the data including the result.

16. A printed article according to claim 1, wherein the printed article comprises a poster.

17. A printed article according to claim 1, wherein the printed article comprises a point-of-sale display.

18. A system comprising:
a printed article according to claim 1;
an electronic device having a microphone for acoustically coupling the printed article and electronic device.

19. A system according to claim 18, wherein the device is a mobile device.

20. A system according to claim 18, wherein the electronic device includes a module for performing frequency analysis of an audio signal.

21. A system according to claim 18 wherein the electronic device includes a module for averaging an audio signal.

22. A method comprising:
a printed article:
receiving user input via at least one touch- or proximity-sensitive switch;
in response to actuation of switch(es), generating encoded data using modulation; and
outputting an audio frequency signal including the encoded data, the audio frequency signal includes a first frequency component having a fixed frequency and a second frequency component having a modulated frequency.

23. A method according to claim 22 comprising:
an electronic device:
receiving the audio frequency signal; and
decoding the signal to extract the data.

24. A method according to claim 22, wherein:
the electronic device:
frequency analyzing the signal to identify the data.

* * * * *